United States Patent [19]
Watanabe et al.

[11] Patent Number: 5,689,103
[45] Date of Patent: Nov. 18, 1997

[54] APPARATUS FOR AND METHOD OF READING A BAR CODE

[75] Inventors: Mitsuo Watanabe; Ichiro Shinoda, both of Kanagawa, Japan

[73] Assignee: Fujitsu Limited, Kanagawa, Japan

[21] Appl. No.: 676,476

[22] Filed: Jul. 8, 1996

[30] Foreign Application Priority Data

Sep. 8, 1995 [JP] Japan ................................. 7-231497

[51] Int. Cl.[6] ................................................. G06K 7/10
[52] U.S. Cl. ................................... 235/462; 235/472
[58] Field of Search ................................. 235/462, 472

[56] References Cited

U.S. PATENT DOCUMENTS 5,621,203  4/1997  Swartz et al. .......................... 235/462

*Primary Examiner*—Harold Pitts
*Attorney, Agent, or Firm*—Nikaido Marmelstein Murray & Oram LLP

[57] ABSTRACT

A CPU demodulates data obtained by a "continuous reading", data obtained by a "block reading" and data obtained by a "divided reading" among a variety of bar width data sets stored in a bar width data set storage buffer before demodulated data corresponding to a whole bar code are first synthesized. Once the demodulated data corresponding to the whole bar code are synthesized, whether the data used for the synthesization include the data obtained by the "divided reading" is checked. Then, if the data used for the synthesization do not include the data obtained by the "divided reading", only the data obtained by the "continuous reading" and the data obtained by the "block reading" are demodulated.

10 Claims, 13 Drawing Sheets

FIG. 10

| | T2 MODULE NUMBER | | | |
|---|---|---|---|---|
| | 2 | 3 | 4 | 5 |
| 2 | E6 | 00 | E4 | 06 |
| 3 | 09 | E2 / E8 | 01 / 07 | E5 |
| 4 | E9 | 02 / 08 | E1 / E7 | 05 |
| 5 | 06 | E0 | 04 | E3 |

T1 MODULE NUMBER

FIG. 11

| B1 \ B3 | 1 | 2 | 3 |
|---|---|---|---|
| 1 | E7 / E8 | 01 | — |
| 2 | 02 | E1 / E2 | 07 |
| 3 | — | 08 | — |

| BEAMS | DEMODULATED CHARACTERS |
|---|---|
| ① | LGB, A, B, C |
| ② | LGB, A, B, C, D, E, F |
| ③ | LGB, A, B, C, D, E, F, CB, a |
| ④ | D, E, F, CB, a, b, c |
| ⑤ | CB, a, b, c, d, e, f, LGB |
| ⑥ | d, e, f, RGB |
| ⑦ | d', e', f', RGB |

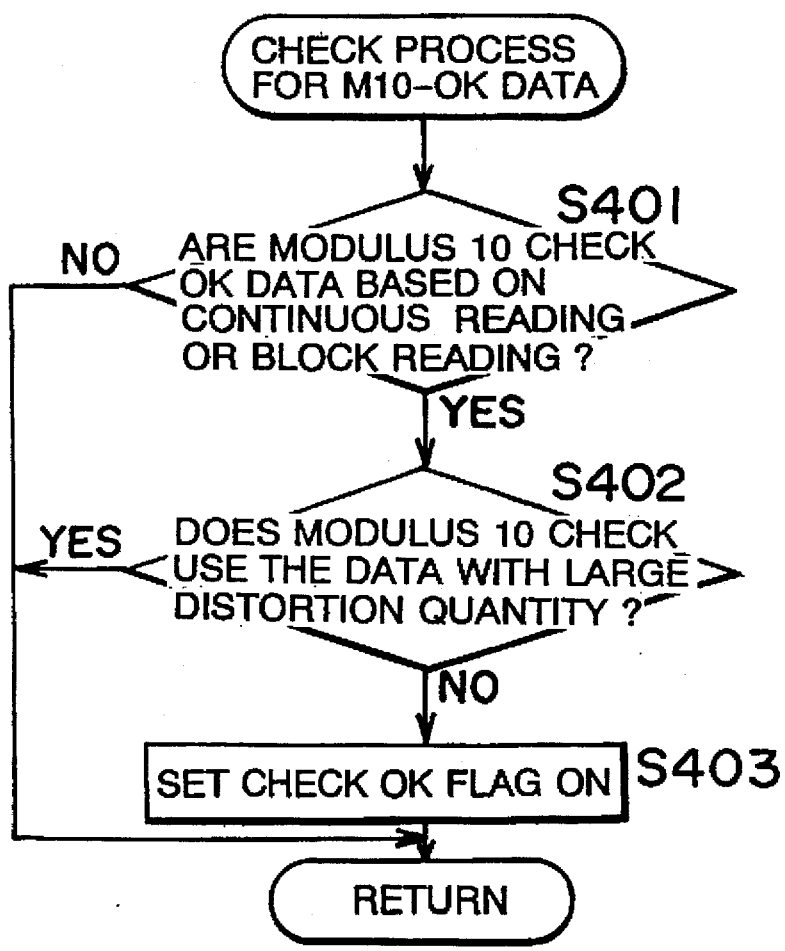

APPARATUS FOR AND METHOD OF READING A BAR CODE

BACKGROUND OF THE INVENTION

1. Field of the Invention

The present invention relates generally to an apparatus for and a method of reading a bar code consisting of blocks of data characters interposed between distinguishing bars with fixed patterns. The present invention relates more particularly to an apparatus for and a method of reading a bar code that are designed to obtain demodulated data corresponding to a whole bar code by synthesizing plural pieces of demodulated data obtained by partially reading the bar code.

2. Description of the Prior Art

A practice of managing commercial goods, etc. by using bar codes has been popularized in recent years as represented by a POS system in a distribution business, etc. For example, in the POS system of a store, such items of data as kinds, sales prices, etc. of the goods are encoded in a bar code format, and such data are printed on the goods. Then, the price is paid based on the read bar code at a cash register, and the numbers of sold goods are added up in real time, which might be useful for stocking and purchasing managements.

By the way, the above bar code is classified roughly into a fixed length code such as a JAN code, a UPC code and an EAN code, and a variable length second code. This fixed length code includes a start guard bar (LSB) affixed to the left end thereof, a center bar (CB) inserted in an intermediate portion thereof and an end guard bar (RSB) affixed to the right end thereof. A first data block consisting of six data characters (each of which is a minimum unit of an encoded numeral value or symbol) is provided between the start guard bar and the center bar. A second data block composed of six data characters is provided between the center bar and the end guard bar. Each of those guard bars and the center bar has special pattern which is predetermined based on the standard respectively, and hence a bar code reading apparatus can recognize those guard and center bars and read the data characters of the bar code, with the recognized bars as clues. A thinkable reading mode therefor may be a "block reading" mode and a "divided reading" mode. The "block reading" mode is a mode of recognizing only a block of the data characters interposed between one guard bar and the center bar as a bar code, and of separately reading two blocks, thereafter synthesizing (joining) demodulated data obtained by reading these blocks, and consequently obtaining the demodulated data corresponding to one set of bar code. Further, the "divided reading" mode is a mode of recognizing a data character string connected to one of the center bar and guard bars as a bar code, and of synthesizing fragments of demodulated data obtained by separately reading these data character strings, and consequently obtaining the demodulated data corresponding to one set of bar code.

The above-mentioned "block reading" mode is a mode of conceiving only the data interposed between the center bar and one guard bar effective and extracting such data from pieces of ambient data. Hence, noises such as data caused by portions other than the bar code can be removed at a high efficiency. A possibility of misreading the block data can be thereby reduced, and therefore the bar code demodulation processing needs only short time. While on the other hand, according to this "block reading", if all data characters of a block are not conceived as effective unless they are consecutively read at one time. Accordingly, in a case where the bar code is printed on, e.g., a bag, the bar code must be scanned by smoothing an area of the bag printed with a bar code so that the respective blocks can be consecutively read. It is because there might be a possibility that the reading is interrupted before reading the whole blocks is completed on account of a "distortion" exceeding an allowable range, if the area printed with bar code has a wrinkle. Therefore, such block reading is suited to read the bar code printed on the surface of a comparatively hard body such as a box, etc.

On the other hand, according to the above "divided reading", the data character strings existing on both sides of a position of "distortion" are respectively read. It is therefore possible to obtain the demodulated data corresponding to the whole bar code on the basis of demodulated data obtained before a timing when the position of "distortion" has shifted and demodulated data obtained after the timing when the position of "distortion" has shifted on the assumption that the position of "distortion" be changed. Accordingly, even in such a case that the bar code is printed on the bag, the demodulated data corresponding to the whole bar code can be obtained without smoothing the area printed with bar code. While on the other hand, according to this "divided reading", since even the data character string including only one of the center bar and the guard bars is to be demodulated, rubbish data (that is, noises) obtained by reading patterns outward of the bar code with the guard bar or the center bar as starting point also become an object for demodulation. Hence, a reliability on the demodulated data is low, and therefore, there must be a high possibility of misreading as result of the synthesization based on the demodulated data. Further, since such rubbish data (noises) are also the object for demodulation, it follows that a demodulation processing time of the bar code also elongates.

As described above, the reading mode, whether the block reading or the "divided reading", has its disadvantages. Accordingly, even though any modes are taken, there are problems inherent in the bar code reading apparatus that must indiscriminately read the bar code printed on the bag and the bar code printed on the box, such as the bar code reading apparatus adopted in the POS system of, e.g., a supermarket.

SUMMARY OF THE INVENTION

It is a primary object of the present invention, which was contrived in view of the above problems, to provide a bar code reading apparatus and a bar code reading method that are capable of automatically switching a bar code reading mode so as to perform "divided reading" for a bar code suitable for the "divided reading" as a bar code printed on a soft sheet such as a bag, etc. and to perform "block reading" for a bar code which can be read by the "block reading" as a bar code printed on a box, thereby saving a labor to smooth the bag when reading the bar code, and reducing a bar code demodulation processing time to the greatest possible degree.

According to a first aspect of a bar code reading apparatus of the present invention, the bar code reading apparatus scans a bar code interposed between distinguishing bars having fixed patterns, detects a bright/dark pattern along a scan trajectory, and demodulates the bright/dark pattern into a data set encoded into the bar code. The bar code reading apparatus comprises a first demodulating unit for demodulating both of a first bright/dark pattern along the scan trajectory that passes through only one of the distinguishing bars and a second bright/dark pattern along the scan trajectory that passes through both of the distinguishing bars. The bar code reading apparatus also comprises a second demodulating unit for demodulating only the second bright/dark pattern, and a whole data set acquiring unit for acquiring whole data sets corresponding to the whole bar code on the basis of the data set demodulated by the first demodulating unit or the second demodulating means. The bar code reading apparatus further comprises a control unit for making only the first demodulating unit execute the demodulation before the whole data set acquiring unit acquires the whole data sets on the basis of only the second bright/dark pattern, and making only the second demodulating unit perform the demodulation after acquiring the whole data sets on the basis of the second bright/dark pattern.

According to a second aspect of a bar code reading apparatus of the present invention, the bar code reading apparatus scans a bar code having three pieces of distinguishing bars with fixed patterns and composed of bar code blocks interposed between the respective distinguishing bars, detects bright/dark patterns along scan trajectories, and demodulates the bright/dark patterns into data sets encoded into the bar code. This bar code reading apparatus comprises a first demodulating unit for demodulating all of a first type of a bright/dark pattern along the scan trajectory that passes through only one piece of distinguishing bar, a second type of a bright/dark pattern along the scan trajectory that passes only two pieces of distinguishing bars, and a third type of a bright/dark pattern along the scan trajectory that passes through three pieces of distinguishing bars. The bar code reading apparatus also comprises a second demodulating means for demodulating only the second type of the bright/dark pattern and the third type of the bright/dark pattern, and a whole data set acquiring unit for acquiring whole data sets corresponding to the whole bar code on the basis of data sets demodulating by the first demodulating unit or the second demodulating unit. The bar code reading apparatus further comprises a control unit for making only the first demodulating unit execute the demodulation before the whole data set acquiring unit acquires the whole data sets on the basis of only the second type of the bright/dark pattern or the third type of the bright/dark pattern, and making only the second demodulating unit perform the demodulation after acquiring the whole data sets on the basis of the second type of the bright/dark pattern or the third type of the bright/dark pattern.

The bar code may have such configurations that only two distinguishing bars are prepared, and that the data characters are interposed between three pieces of distinguishing bars, respectively, as long as composed of data characters interposed between the distinguishing bars with the fixed patterns. The former example may include variable length codes such as, e.g., an ITF code, NW-7, CODE39 and CODE128. Further, the latter example may include fixed length codes such as, e.g., a UPC code, a JAN code and an EAN code.

The first bright/dark pattern along the scan trajectory that passes through only one of the distinguishing bars which is demodulated by the first demodulating unit, includes the first type of the bright/dark pattern along the scan trajectory that passes through only one distinguishing bar. Further, the second bright/dark pattern along the scan trajectory that passes through both of the distinguishing bars which is demodulated by the first demodulating unit and the second demodulating unit, includes the second type of the bright/dark pattern along the scan trajectory that passes through only two distinguishing bars, and the third type of the bright/dark pattern along the scan trajectory that passes through three distinguishing bars.

The first demodulating unit may demodulate only the bright/dark pattern along the scan trajectory that passes through the single distinguishing bar which includes a fixed number of characters which are mutually linked. With this operation, rubbish data that happens to have the same pattern as the distinguishing pattern can be prevented from being mixed in, and a possibility of misreading the data is thereby decreased.

Further, the first demodulating unit and the second demodulating unit may perform the demodulation only when a length of the bright/dark pattern corresponding to each character falls within a fixed range. If based on the bright/dark pattern which is extremely stretched or contracted, there must be a possibility in which the original data can not be accurately demodulated. It is therefore feasible to prevent the misreading of the data by demodulating no such bright/dark pattern.

When the bar code has the three distinguishing bars, the whole data acquiring unit acquires the whole data sets by synthesizing a plurality of data sets demodulated based on the first type of the bright/dark pattern or the plurality of data sets demodulated based on the second type of the bright/dark pattern. Further, the data sets demodulated based on the third type of the bright/dark pattern are treated intactly as the whole data sets. That is to say, the term "acquire" connotes obtaining the whole data sets irrespective of whether the data sets are synthesized or not.

The control unit may make only the first demodulating unit perform the demodulation also after the whole data set acquiring unit has acquired the whole data sets on the basis of only the second bright/dark pattern if a ratio between the bright/dark patterns corresponding to the respective characters exceeds a fixed range. Further, the control unit may make only the first demodulating unit perform the demodulation also after the whole data set acquiring unit has acquired the whole data sets on the basis of only the second bright/dark pattern if a ratio between the bright/dark patterns corresponding to the respective modules exceeds a fixed range. In these cases, there is a high possibility of causing a distortion of a soft sheet of a bag or the like on which the bar code is printed, and hence there must be a high probability in which the whole data set can not be acquired from only the data sets demodulated based on the second bright/dark pattern.

According to a first aspect of a bar code reading method of the present invention, the bar code reading method involves scanning a bar code interposed between distinguishing bars having fixed patterns and disposed at both ends thereof, detecting a bright/dark pattern along a scan trajectory, and demodulating the bright/dark pattern into a data set encoded into the bar code. The bar code reading method comprises a step of demodulating both of a first bright/dark pattern along the scan trajectory that passes through only one of the distinguishing bars and a second bright/dark pattern along the scan trajectory that passes through both of the distinguishing bars. The bar code reading method also comprises a step of acquiring the whole data sets corresponding to the whole bar code on the basis of the first bright/dark pattern or the second bright/dark pattern, and a step of demodulating only the second bright/dark pattern after acquiring the whole data sets on the basis of only the second bright/dark pattern.

According to a second aspect of a bar code reading method of the present invention, the bar code reading method involves scanning a bar code having three pieces of distinguishing bars with fixed patterns and composed of bar code blocks interposed between the respective distinguishing bars, detecting bright/dark patterns along scan trajectories, and demodulating the bright/dark patterns into data sets encoded into the bar code. This bar code reading method comprises a step of demodulating all of a first type of a bright/dark pattern along the scan trajectory that passes through only one piece of distinguishing bar, a second type of a bright/dark pattern along the scan trajectory that passes through only two pieces of distinguishing bars, and a third type of a bright/dark pattern along the scan trajectory that passes through three pieces of distinguishing bars. The bar code reading method also comprises a step of acquiring whole data sets corresponding to the whole bar code on the basis of the first type of the bright/dark pattern, the second type of the bright/dark pattern or the third type of the bright/dark pattern, and a step of demodulating only the second type of the bright/dark pattern and the third type of the bright/dark pattern after acquiring the whole data sets on the basis of only the second type of the bright/dark pattern or the third type of the bright/dark pattern.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is a distance demodulation table;

FIG. 11 is a bar width demodulation table;

FIG. 18 is a flowchart showing a data check process for the modulus 10 OK data executed in step S008 of FIG. 3 in a second embodiment of the present invention.

DESCRIPTION OF THE PREFERRED EMBODIMENTS

Next, embodiments of the present invention will hereinafter be discussed with reference to the accompanying drawings.

First Embodiment (Principle of Embodiment)

Figure 1:
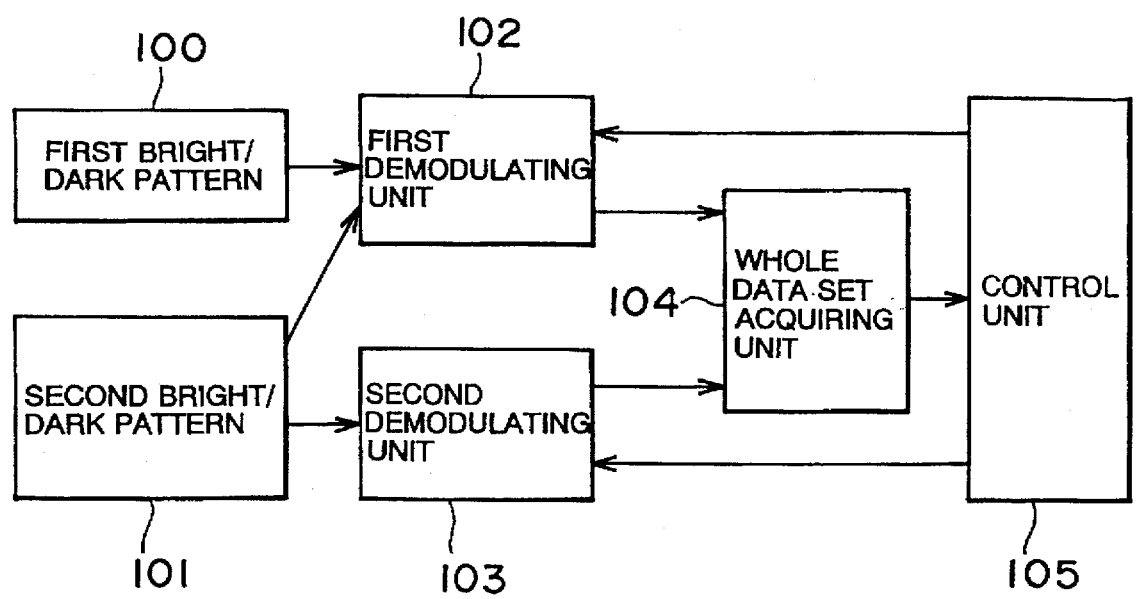
FIG. 1 is a diagram showing the principle of a first embodiment of the present invention.

FIG. 1 is a block diagram schematically showing the principle of a bar code reading apparatus in a first embodiment of the present invention.

Referring to FIG. 1, a first demodulating unit 102 demodulates both of a first bright/dark pattern 100 on a scan trajectory which passes through one of distinguishing bars and a second bright/dark pattern 101 which passes through both of the distinguishing bars under control of a control unit 105 in an initial status. Based on a data set demodulated by the first demodulating unit 102, a whole data set obtaining unit 104 obtains the whole data set corresponding to a whole bar code. After the whole data set obtaining unit 104 has obtained the whole data set on the basis of only the second bright/dark pattern, In accordance with the control of the control unit 105, the first demodulating unit 102 stops demodulation, and a second demodulating unit 103 demodulates only the second bright/dark pattern 101. The whole data set obtaining unit 104 hereafter obtains the whole data set corresponding to the whole bar code on the basis of the data set demodulated from the second bright/dark pattern 101 by the second demodulating unit 103.

(Whole Construction of Bar Code Reading Apparatus)

Figure 2:
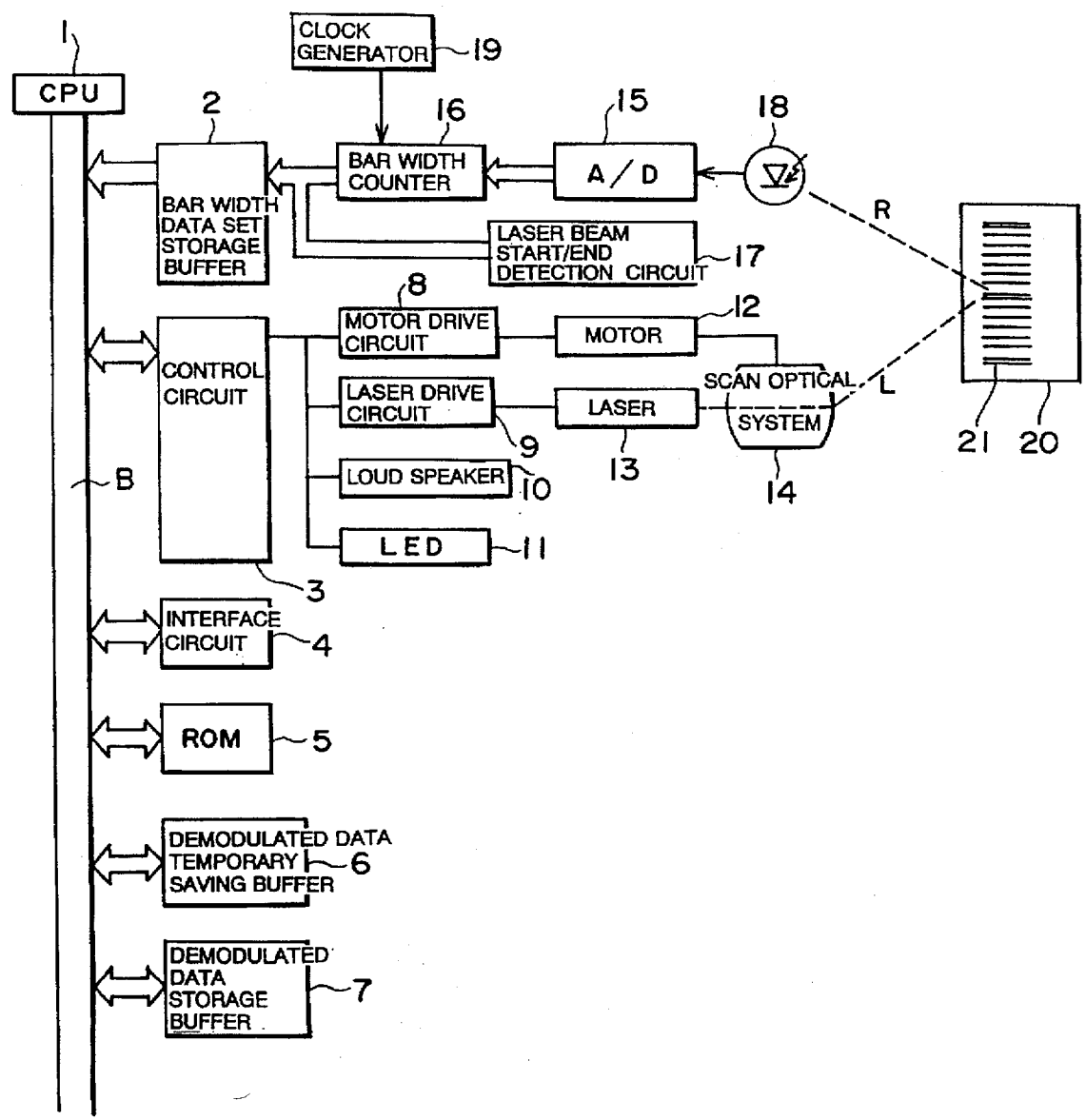
FIG. 2 is a block diagram illustrating a bar code reading apparatus in a first embodiment of the present invention.

FIG. 2 is a block diagram schematically showing a construction of a bar code reading apparatus in the first embodiment of the present invention. The bar code reading apparatus in the first embodiment is an apparatus for reading a bar code 21 into which data are coded in accordance with a UPC code format and which is printed on the surface of the goods 20.

Referring to FIG. 2, a CPU 1 is connected via a bus to a bar width data set storage buffer 2, a control circuit 3, an interface circuit 4, a ROM 5, a demodulated data temporary saving buffer 6 and a demodulated data storage buffer 7. This CPU 1 controls the whole bar code reading apparatus and executes a data demodulation process to demodulate the bar width data set obtained by reading the bar code 21 printed on the surface of the goods 20.

The ROM 5 is a read-only memory stored with a bar code recognizing/demodulating process program which is to be executed by the CPU 1. The interface circuit 4 is a circuit for controlling a status of a bus B for connecting the CPU 1 to other circuit and for controlling a data transmission to an outside device.

The control circuit 3 is a circuit for controlling a motor drive circuit 8, a laser drive circuit 9, a loud speaker 10 and a light emitting diode (LED) 11. The motor drive circuit 8 drives a motor 12 to rotate a polygon mirror (which is not shown) constituting a scan optical system 14. Further, the laser drive circuit 9 drives a semiconductor laser 13 to emit laser beams L. Further, the loud speaker 10 emits a voice indicating a completion of reading (demodulating) the bar code. The light emitting diode 11 is a display element for displaying data such as a sales price, etc. of the goods 20, which are obtained as a result of the demodulation of the bar code.

The laser beams L emitted from the semiconductor laser 13 are made incident to the scam optical system 14 and deflected by this scan optical system 14. More specifically, the scan optical system 14 deflects the laser beams L in one direction by use of the polygon mirror (not shown) rotated by the motor 12. A plurality of fixed mirrors are fixed on the side opposite to the polygon mirror. Accordingly, the laser beams L deflected by the polygon mirror are re-reflected in various direction by the respective fixed mirrors. As a result, the deflecting direction (which is the scan direction) of the laser beams L is changed to a variety of directions. The scan optical system 14 performs consecutive laser-beam scans in the plurality of directions at a high speed within a period (from a timing when the laser beams L start to be made incident on one reflection surface till a timing when the laser beams come off the same surface) of the deflection by one reflection surface of the polygon mirror. Each of the plurality of laser-beam scans performed within the period of the deflection by one reflection surface of the polygon mirror is hereinafter referred to as "one scan".

When the thus scanning laser beams L strike on the surface (containing a bar code 21) of the goods 20, the laser beams L are irregularly reflected from the surface, and some of reflected beams R are received by the light receiving element (which is the photo diode) 18. The light receiving element 18 outputs electric currents corresponding to brightness and darkness of the reflected light beams R received. An A/D converter 15 compares the electric current outputted by the light receiving element 18 with a predetermined threshold value and converts the current into a binary signal. This binary signal indicates "H" level when an intensity of the reflected beams R corresponds to a reflectivity of the black bar in the bar code 21 and "L" level when the intensity of the reflected beams R corresponds to a reflectivity of the white bar in the bar code 21.

A bar width counter 16 measures a period from a rise timing of the binary signal to a fall timing thereof (which is expected to correspond to a width of the black bar in the bar code 21). The bar width counter 16 also measures a period from the fall timing of the binary signal to the rise timing thereof (which is expected to correspond to a width of the white bar in the bar code 21). Note that the bar width counter 16 counts the number of clocks inputted from a clock generator 19 for measuring the time corresponding to each of those bar widths. Read data of the respective bars that are outputted from the bar width counter 16 take such a form that the count value and a color distinguishing signal indicating the white or the black are combined. The bar width counter 16 consecutively outputs the read data each time the laser-beam is scanned. A series of the read data that are thus consecutively outputted during each one scan are called as "bar width data set".

The bar width data set outputted from the bar width counter 16 is inputted to a laser beam start/end detection circuit 17. This laser beam start/end detection circuit 17 checks a status of the bar width data set and detects a start timing and an end timing of one scan of laser beams. The laser beam start/end detection circuit 17 then adds to the bar width data set pieces of data indicating the start timing and the end timing.

The bar width data set storage buffer 2 temporarily stores the bar width data set to which the data indicating the start timing and end timing of the laser beams are added. The bar width data set storage buffer 2 sequentially stores the bar width data set inputted from the bar width counter 16 and transfers the bar width data set piece by piece in the sequence in which the data set has been stored in response to a request from the CPU 1.

The demodulated data temporary saving buffer 6 is a memory for storing the demodulated bar width data set. Further, the demodulated data storage buffer 7 is a memory for storing the demodulated data corresponding the whole bar code obtained by synthesization.

(Bar Width Data Set)

Figure 15:
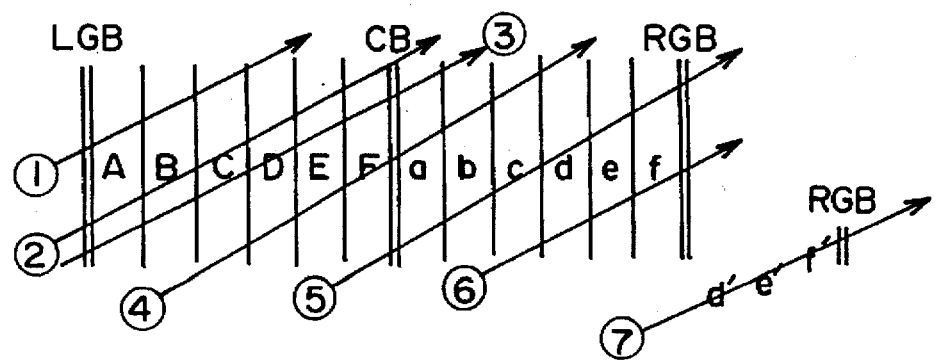
FIG. 15 is a diagram illustrating an example of scan trajectories on a bar code

Explained next referring to FIG. 15 is the bar width data set stored as the bright/dark patterns in the bar width data set storage buffer 2. Respective arrows shown in FIG. 15 indicate scan trajectories of the laser beams L. The arrows (1), (2), (4) and (6) among those arrows represent trajectories pass over only one of a start guard bar (LGB), a center bar (CB) and an end guard bar (RGB) each serving as a distinguishing bar. Hence, the bar width data sets picked up by scanning along those trajectories are defined as bright/dark patterns of first type on the scan trajectories including only one distinguishing bar (which are first bright/dark patterns on the scan trajectories including only one of the distinguishing bars) as well as bar width data sets based on "divided reading".

Further, the arrow (3) indicates a trajectory passing over all characters of a first block including the start guard bar (LGB) and the center bar (CB). The arrow (5) represents a trajectory passing over all the characters of a second block including the center bar (CB) and the end guard bar (RGB). Accordingly, the bar width data sets picked up by the scans along those trajectories are defined as bright/dark patterns of second type on the scan trajectories including only two distinguishing bars (which are second bright/dark patterns on the scan trajectories including both of the distinguishing bars) as well as bar width data sets based on block reading.

Furthermore, though not shown, the bar width data sets picked up along the trajectories passing over all of the start guard bar (LGB), the center bar (CB) and the end guard bar (RGB) are those obtained by consecutively reading all the data characters. Namely, such bar width data sets are defined as a bright/dark pattern of third type (which are second bright/dark patterns on the scan trajectories including both of the distinguishing bars) on the scan trajectories including the three distinguishing bars as well as the bar width data sets based on continuous reading.

(Demodulation Algorithm)

Figure 9:
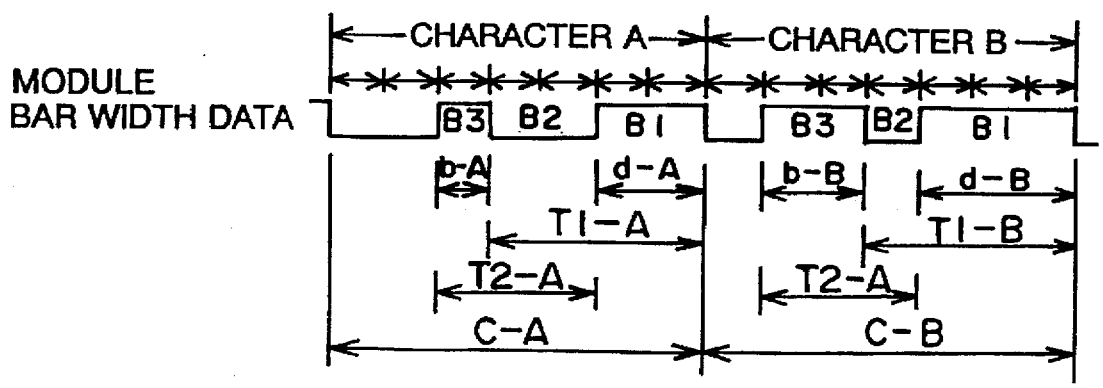
FIG. 9 is diagram illustrating a structure of a character in a UPC code.

Next, an outline of a general algorithm for demodulating the UPC code will be explained. Each character in the UPC code is, as illustrated in FIG. 9, composed of a combination of two white bars and two black bars which are formed from each of seven modules (each having a unit length) allocated to white or black. A demodulating unit of the CPU 1 calculates a sum length (which is called a T1 module) of a length of a tail black bar (B1) of each character and a length of a white bar (B2) just anterior thereto. The same demodulating unit calculates also a sum length (which is called a T2 module) of a length of the white bar (B2) and a length of a black bar (B3) just anterior thereto. These T1 and T2 modules are referred to as a "δ distance". Then, the demodulating unit of the CPU 1 reads corresponding data on the basis of a module number of each of the T1 and T2 modules with reference to a distance demodulation table shown in FIG. 10. Note that the reference symbol "E-" of each item of data shown in FIG. 10 represents a value of an even-numbered parity, while "O-" designates a value of an odd-numbered parity.

Incidentally, in the distance demodulation table shown in FIG. 10, in the-case that the number of modules included in each of the T1 and T2 modules is 3 or 4, there are two kinds of corresponding data are prepared, and any one of these items of data can not be therefore specified. Hence, in this case, the demodulating unit of the CPU 1 specifies which data it is on the basis of the module number of the black bar (B1) and the black bar (B3) with reference to a bar width demodulation table shown in FIG. 11. For example, the character A and the character B shown in FIG. 9 are demodulated as "02" or "8" with reference to the distance demodulation table shown in FIG. 10. Further, the character A is specified as "02", while the character B is specified as "08" with reference to the bar width demodulation table shown in FIG. 11.

(Check of Distortion Quantity)

Next, a method of checking a distortion quantity that is executed in this embodiment will be explained. The check of this distortion quantity involves a "check of distortion quantity of character", a "check of distortion quantity of δ distance" and a "check of distortion quantity of each bar".

Figure 12:
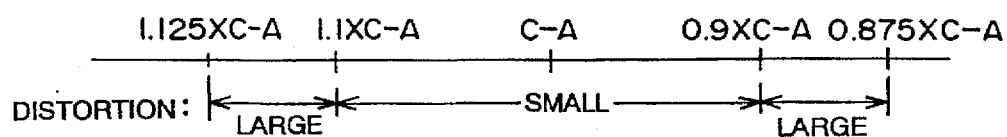
FIG. 12 is an explanatory diagram of a distortion quantity of an adjacent character length.

According to the "check of distortion quantity of character", as illustrated in FIG. 12, the distortion quantity is determined to be small when a bar width count value (C-B) of the character falls within a range of 0.9 through 1.1 times a bar width count value (C-A) of the character which was an object of the check just anterior thereto and determined to be large when it exceeds the range.

Figure 13:
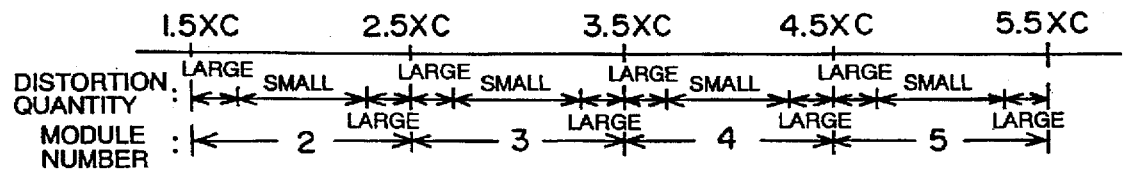
FIG. 13 is a conversion chart of a distortion quantity of δ distance.

According to the "check of distortion quantity of δ distance", a count value obtained by equally dividing by 7 a total sum (C-B) of all the bar width count values in the characters which is an object of the check is substituted into a value of "c" in a Table shown in FIG. 13. Then, the module number of each δ distance is read based on the bar width counter values (T1-B, T2-B) of the respective δ distances with reference to the Table of FIG. 13. And, a distortion quantity thereof is determined to be small or large.

Figure 14:
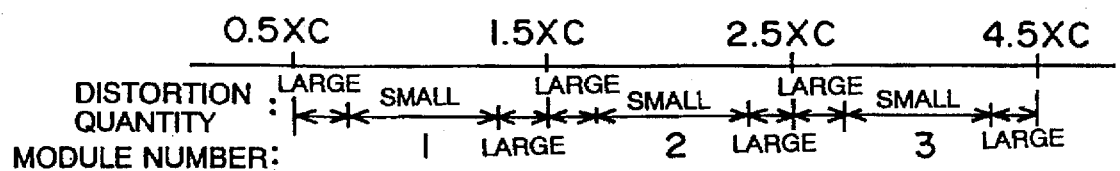
FIG. 14 is a conversion chart of a distortion quantity of each bar.

According to the "check of distortion quantity of each bar", the count value obtained by equally dividing by 7 the total sum (C-B) of all the bar width count values in the characters which is an object of the check is substituted into a value of "c" in a Table shown in FIG. 14. Then, the module number of each bar is read based on the bar width counter values (b-B, d-B) of the respective bars with reference to the Table of FIG. 14. Then, a distortion quantity thereof is determined to be small or large.

(Bar Code Recognizing/Demodulating Process)

Next, particulars of a bar code recognition/demodulation process program actually executed by a CPU 1 will be explained with reference to flowcharts shown in FIGS. 3 through 8. In this bar code recognizing/demodulating process, a success in the reading process is established when a total number of times of acquiring the demodulated data corresponding to the whole bar code on the basis of bar width data set obtained by the "continuous reading (which is to continuously read all the data characters between the two guard bars by one scanning process), and times of acquiring the demodulated data corresponding to the whole bar code by demodulating the respective bar width data sets obtained based on the "block reading" or the "divided reading" and thereafter synthesizing the demodulated bar width data sets, reaches 2.

Figure 3:
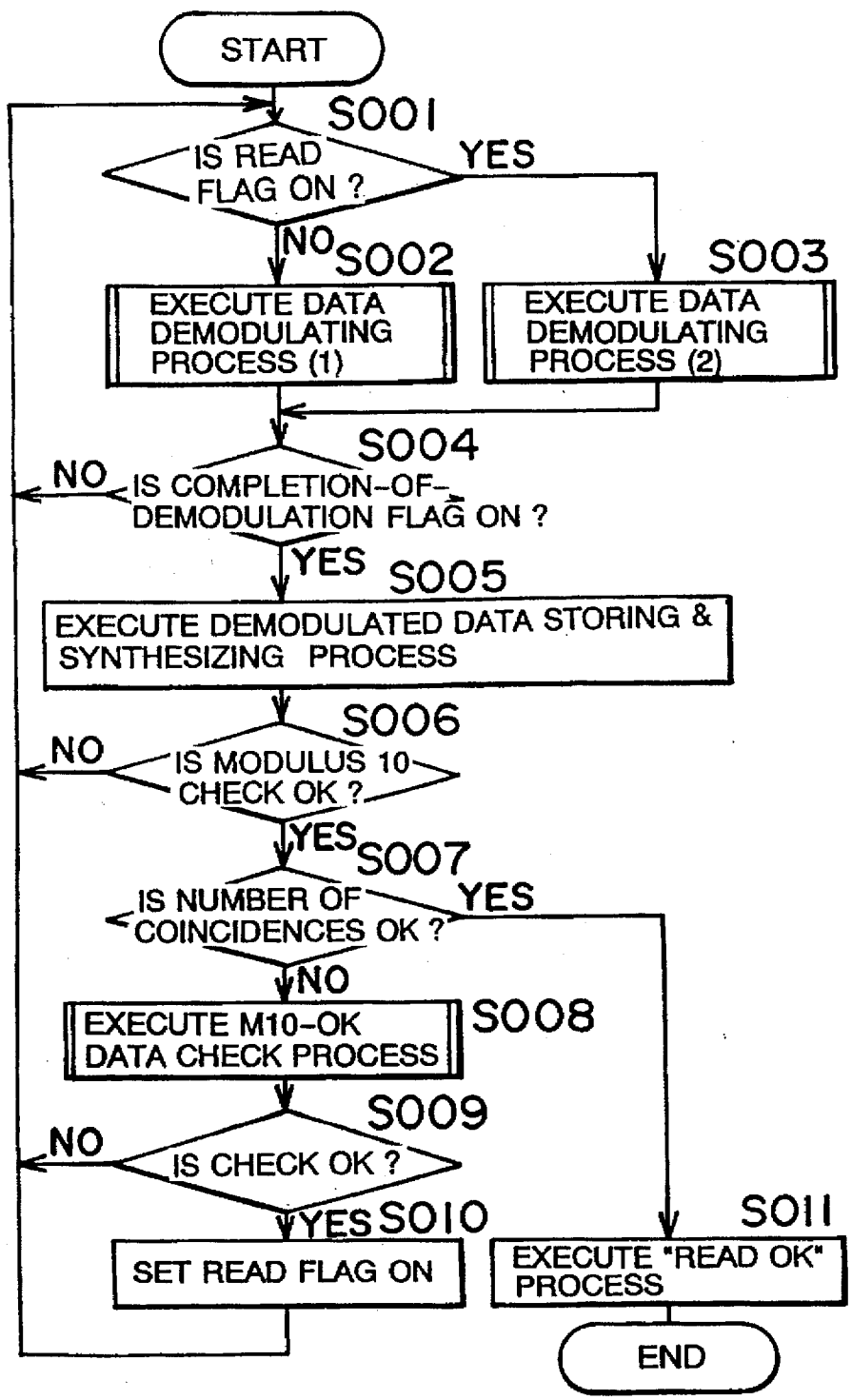
FIG. 3 is a flowchart showing a bar code recognition/demodulation processing program executed by a CPU shown in FIG. 2.

FIG. 3 shows the flowchart of a main routine of the bar code recognizing/demodulating process. This main routine starts when a main power is supplied to the bar code reading apparatus and the bar width data set storage buffer 2 is stored with a bar width data set. Checked in first step S001 is whether a "read flag" is set in a RAM area in the CPU 43. This "read flag" is a flag for indicating the fact that the demodulated data corresponding to the whole bar code is acquired on the basis of the bar width data set obtained by the continuously reading, or the fact that the demodulated data corresponding to the whole bar code is acquired by the demodulating each of the bar width data sets obtained by the "block reading" and thereafter synthesizing the demodulated bar width data sets.

If this "read flag" is not set, a data demodulating process (1) is executed in step S002. This data demodulating process (1) is a process for demodulating even the bar width data set (having continuous three or more characters) obtained by the "divided reading" (which corresponds to a first demodulating unit). On the other hand, if the "read flag" is set, a data demodulating process (2) is executed in step S003. This data demodulating process (2) is a process for demodulating only the bar width data set consisting of data characters continuous over one or more blocks.

Checked in next step S004 executed in any case is whether a "completion-of-demodulation flag" is set in the RAM area of the CPU 43. This "completion-of-demodulation flag" is a flag indicating a completion of demodulating a bar width data set in the data processing process (1) in step S002 or in the data demodulating process (2) in step S003. If this "completion-of-demodulation flag" is not set, the bar width data set to be processed this time is discarded of, and the processing returns to step S001 to newly execute the demodulating process for the bar width data set fetched out of the bar width data set storage buffer 2.

Contrastingly, if the "completion-of-demodulation flag" is set, in step S005, the demodulated data temporary saving buffer 6 is stored with the demodulated data as a result of the demodulation, and all items of demodulated data stored in the demodulated data temporary saving buffer 6 are synthesized (which corresponds to a whole data set acquiring unit). This synthesizing process is carried out by applying each piece of demodulated data to the UPC format defined as a fixed format with a guard bar or/and a center bar (CB) included in the demodulated data as clue.

In next step S006, a modulus 10 check is executed. This modulus 10 check is a checking process of determining whether the demodulated data corresponding to the whole bar code are successfully acquired by the synthesizing process in step S005. If a result of this modulus 10 check is NG (indicating a failure of acquiring the demodulated data), this implies that all the demodulated data are not yet prepared, and therefore the processing returns to step S001 to newly execute the demodulating process for the bar width data set fetched out of the bar width data set storage buffer 2.

Contrastingly, if the result of the modulus 10 check is OK (indicating a success in the acquisition of the demodulated data), this implies an acquisition of the demodulated data corresponding to whole bar code on the basis of the bar width data set obtained by the "continuous reading" or an acquisition of the demodulated data corresponding to the whole bar code by the synthesizing process in step S005. Hence, the processing proceeds to step S007.

In step S007, the number of coincidences is checked. This number of coincidences is such a number of times that the result of the modulus 10 check in step S006 becomes OK. In accordance with this embodiment, whether the number of coincidences comes to 2 is checked.

Figure 8:
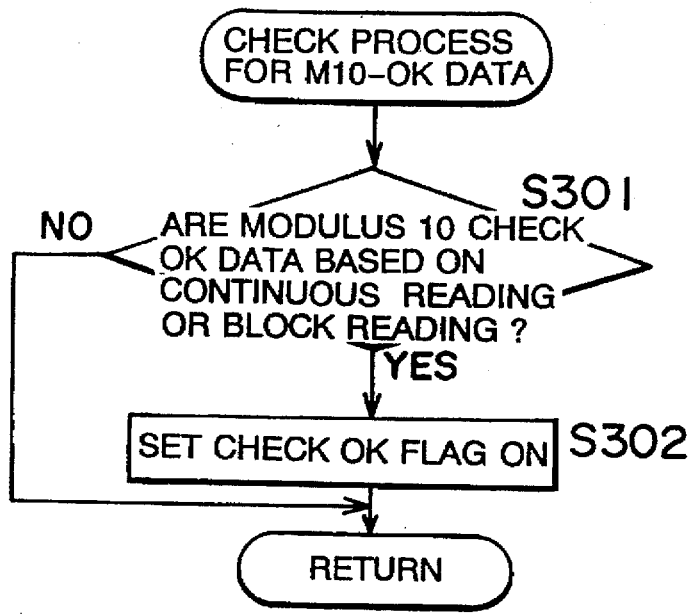
FIG. 8 is a flowchart showing a data check process for modulus 10 OK data executed in step S008 of FIG. 3.

Then, if the number of coincidences is still less than 2, a data check process for a modulus 10 OK is executed in step S008. This data check process for the modulus 10 OK is a process for checking whether each piece of the demodulated data (on which the synthesization in S005 is based) to which the modulus 10 check is executed in step S006 is based on the bar width data set obtained by the "continuous reading" or the "block reading". FIG. 8 shows a data check processing subroutine for the modulus 10 OK executed in step S008.

Checked in first step S301 after entering this subroutine is whether each piece of demodulated data (on which the synthesization in step S005 is based) to which the modulus 10 check is executed in step S006 is based on the bar width data set obtained by the "continuous reading" or the bar width data set in which data characters are continuously linked over one or more blocks. Then, if the demodulated data is based on neither the bar width data set obtained by the "continuous reading" or the bar width data set in which data characters are continuously linked over one or more blocks, the above subroutine is ended as it is, and the processing returns to the main routine shown in FIG. 3. In contrast with this, if the demodulate data is based on the bar width data set obtained by the "continuous reading" or the bar width data set including the data characters continuing over one or more blocks, the above subroutine is ended after a "check OK flag" is set in step S302, and the processing returns to the main routine shown in FIG. 3.

In the main routine shown in FIG. 3, to which the processing has been returned, whether the "check OK flag" is set is checked in step S009. Then, if the "check OK flag" is not set, the processing is returned directly to step S001 to reexecute the data demodulating process (1) in step S002 for the bar width data set fetched next out of the bar width data set storage buffer 2. Contrastingly if the "check OK flag" is set, the processing is returned to step S001 to execute the data demodulating process (2) in step S003 for the bar width data set fetched next out of the bar width data set storage buffer 2 after setting the "read flag" in step S010. Those steps S008 through 010 and S001 correspond to processes by a control unit.

If step S002 or S003 is executed after the modulus 10 check has once resulted in OK in step S006, the number of coincidences might be determined as OK (which indicates twice) in step S007. In this case, the processing proceeds to step S011, wherein a "read OK" process is to be executed. In this "read OK" process, the loud speaker 10 emits a voice indicating a completion of reading (demodulating) the bar code, and items of data about a sales price, etc. of the goods 20 that have been obtained as a result of demodulating the bar code are displayed on the light emitting diode 11. thereafter, this process is finished.

Figure 4:
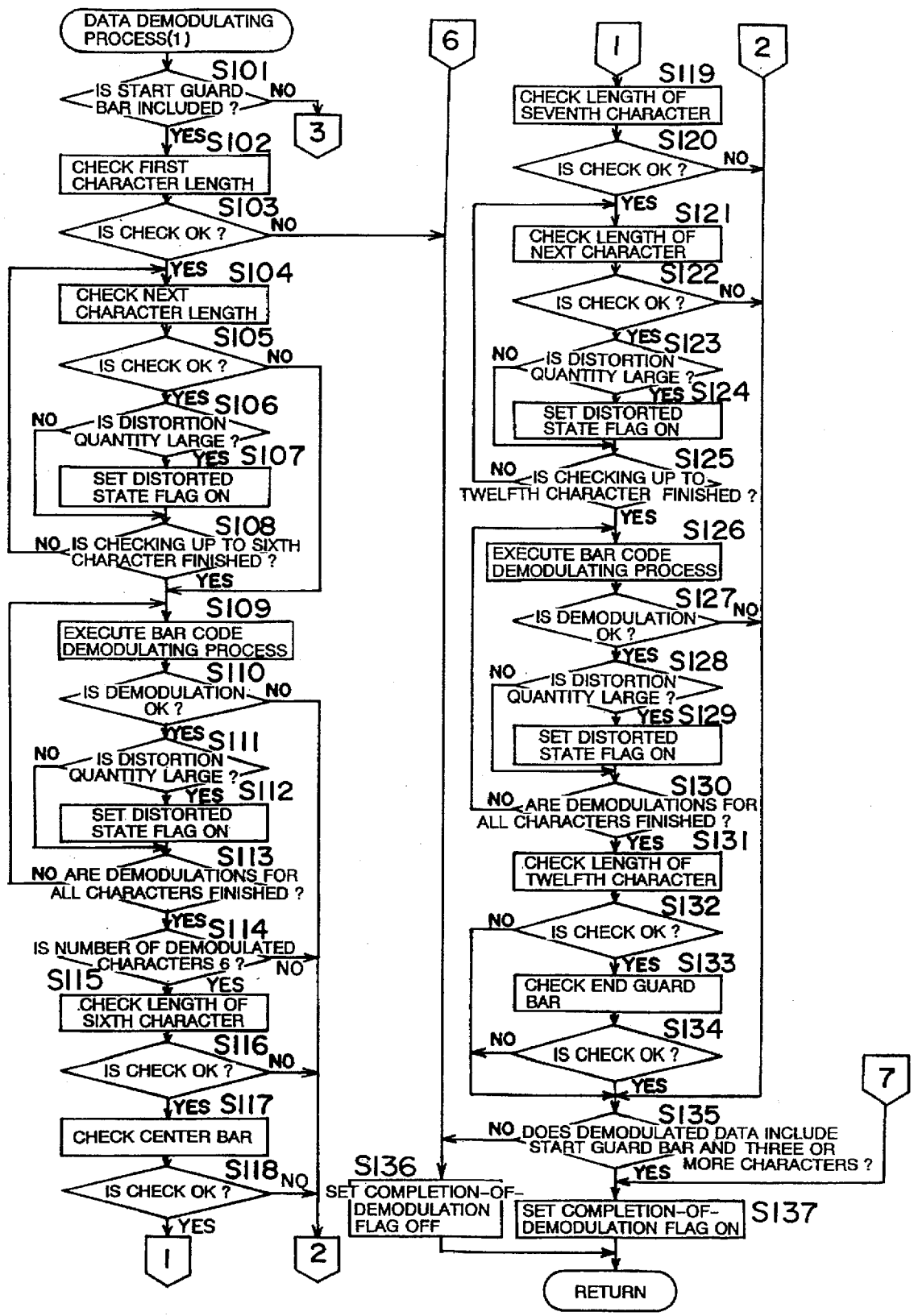
FIG. 4 is a flowchart showing a data demodulating process (1) executed in step S002 of FIG. 3.
Figure 5:
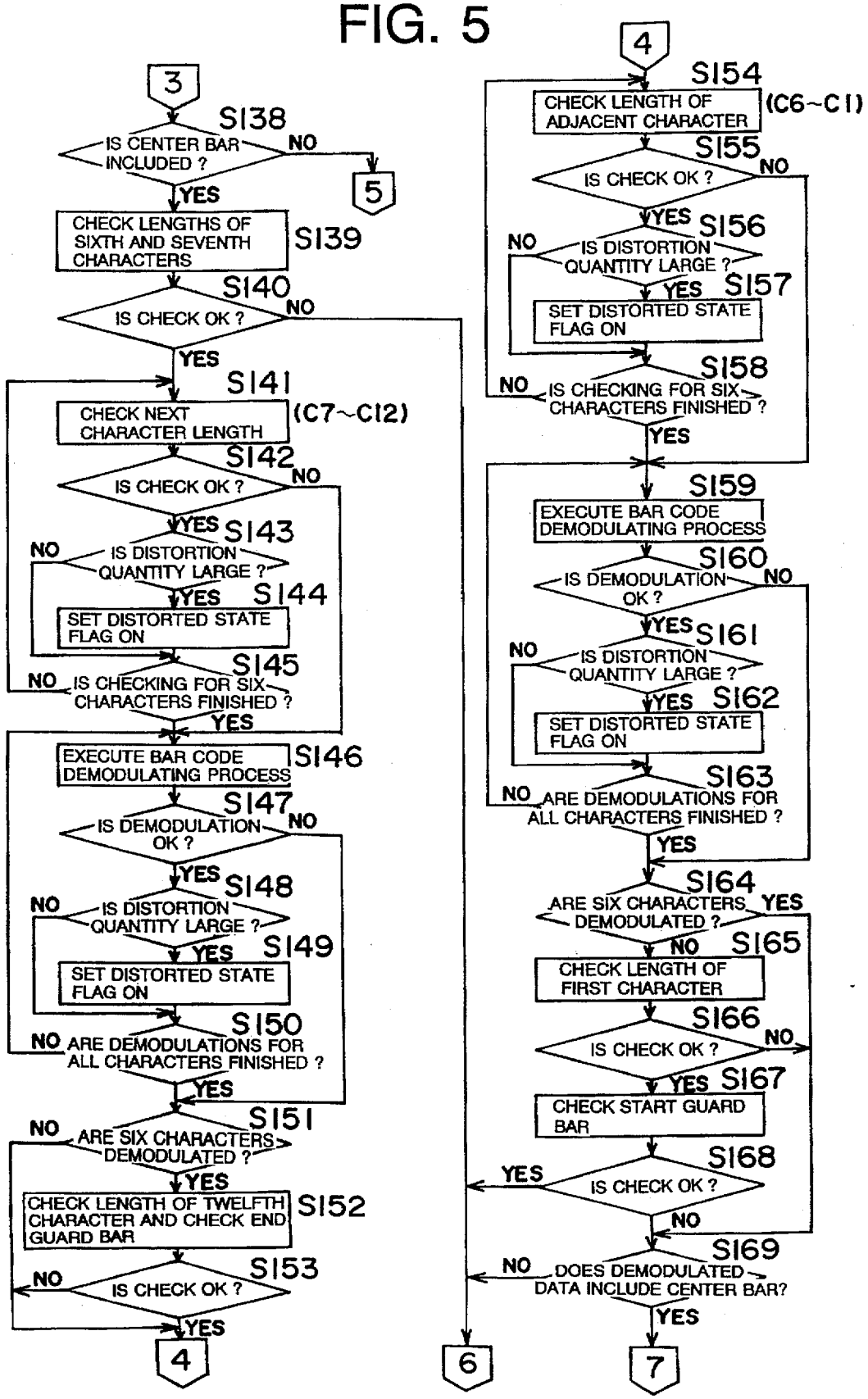
FIG. 5 is a flowchart showing the data demodulating process (1) executed in step S002 of FIG. 3.
Figure 6:
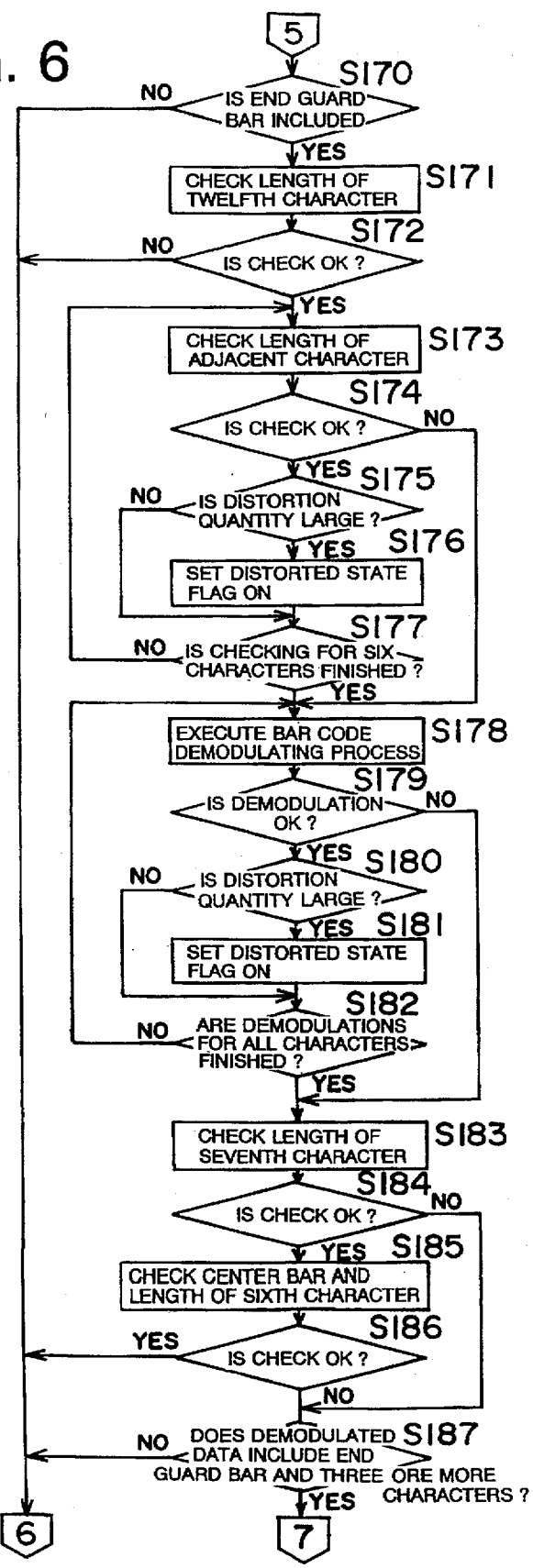
FIG. 6 is a flowchart showing the data demodulating process (1) executed in step S002 of FIG. 3.

Next, a content of the data demodulating process (1) executed in step S002 shown in FIG. 3 will be explained. FIGS. 4 to 6 are flowcharts showing the subroutine of the data demodulating process (1). In first step S101 after entering this subroutine, the oldest bar width data set is fetched from the bar width data set storage buffer 2, and whether the fetched bar width data set passes through the start guard bar (LGB) is checked. Then, if the same bar width data set passes through the start guard bar, the processing proceeds to step S102. Steps S102 through S135 involve processes for demodulating the characters as far as possible to be demodulated with the start guard bar as starting point.

In step S102, a length of a first character (next to the start bar on the side toward the center bar) is checked. More specifically, it is checked whether or not a total sum of bar width count values of four bars forming the first character is in the vicinity of a fixed value. Then, if the length of the first character is not in the vicinity of the fixed value (S103), the data set is conceived as a data set based on a pattern other than the bar code. In this case, a "completion-of-demodulation flag" is reset in step S136, and this subroutine is ended. Contrastingly, if the length of the first character is in the vicinity of the fixed value (S103), the processing proceeds to step S104.

In step S104, a length of the next character (which is defined as second character next to the first character in the initial status) is checked. Then, if the length of this character is not in the vicinity of the fixed value (S105), the processing proceeds to step S109 to demodulate the characters in the first block of which length has hitherto been determined to be in the vicinity of the fixed value. Contrastingly, if the length of the same character is in the vicinity of the fixed value (S105), whether a distortion quantity of the character is large is checked in step S106. More specifically, as discussed above, there are executed the "check of distortion quantity of character", the "check of distortion quantity of δ distance", and the "check of distortion quantity of each bar". Subsequently, if all the distortion quantity of the character is small, the processing proceeds directly to step S108. If any one of the distortion quantities of the character is large (i.e., if a ratio between items of bar width data (which are bright/dark data) corresponding to the respective characters exceeds a fixed range, or if a ratio between items of bar width data (which are bright/dark data) corresponding to the respective modules exceeds a fixed range), however, the processing proceeds to step S108 after setting a "distorted state flag" in step S107. Checked in step S 108 is whether the checking processes of the lengths of the characters are finished up to the sixth character (adjacent to the center bar on the side toward the start bar). Then, when the checks of the lengths of the characters are finished up to the sixth character, the processing proceeds to step S109 to demodulate the six characters constituting the first block. Whereas, if the checks of the lengths of characters are not yet finished up to the sixth character, the processing is returned to step S104 to check a length of the next character adjacent thereto.

In step S109, the character closest to the start guard bar is fetched out of the characters of which lengths are determined to be in the vicinity of the fixed value in steps S103 and S105, and the demodulating process for the fetched character is executed. In next step S110, whether the demodulating process in step S109 succeeds or not is checked. Then, if the demodulating process does not succeed, the processing proceeds to step S135 to finish this subroutine. If the demodulating process succeeds, the processing proceeds to step S111. In step S111, whether the distortion quantity of the character is large is checked. Then, if the distortion quantity of the character is small, the processing proceeds directly to step S113. Whereas, if the distortion quantity of the character is large, the "distorted state flag" is set in step S112, and the processing proceeds to step S113. Checked in step S113 is whether there are completed the demodulating processes corresponding to the number of all the characters of which lengths are determined to be in the vicinity of the fixed value in the character length checking in steps S103 and S105. Then, if the demodulating processes for all the characters are not yet completed, the processing returns to step S109 to execute the demodulating process for the next adjacent character. In contrast with this, if the demodulating processes for all the characters are completed, the processing proceeds to step S114.

Checked in step S114 is whether the number of the characters that have been demodulated by the demodulating process in step S109 is 6. Then, if the number of character is less than 6, there is nothing but such a possibility that the bar width data set to be processed is obtained by the "divided reading", and hence the processing proceeds to step S135 to finish this subroutine. Contrastingly, if the number of characters that has been demodulated is 6, the processing proceeds to step S115.

In step S115, the length of the sixth character is again checked. Subsequently, if the length of the sixth character is not in the vicinity of the fixed value (S116), the processing proceeds to step S135. Contrastingly, if the length of the sixth character is in the vicinity of the fixed value (S116), the center bar is checked in step S117. This check of the center bar is a process of checking whether the character next adjacent to the sixth character coincides with a predetermined pattern set as the center bar. Then, when a desirable result of the center bar checking is obtained (S118), the processing proceeds to step S119. Contrastingly, when no desirable result of the center bar checking is obtained (S118), the bar width data set to be processed is determined to be a bar width data set obtained by the "divided reading", and the processing therefore proceeds to step S135 to finish this subroutine.

In step S119, a length of a seventh character (next to the center bar on the side toward the end guard bar) is checked. Then, if the length of the seventh character is not in the vicinity of a fixed value (S120), the bar width data set to be processed is determined not to be the bar width data set obtained by the "continuous reading", and hence the processing proceeds to step S135 to finish this subroutine. Whereas, if the length of the seventh character is in the vicinity of the fixed value (S120), the processing proceeds to step S121.

Checked in step S121 is a length of the next character (which is an eighth character next to the seventh character in the initial status). Then, if the length of the eighth character is not in the vicinity of a fixed value (S122), the bar width data set to be processed is determined not to be the bar width data set obtained by the "continuous reading", and hence the processing proceeds to step S135 to finish this subroutine. Whereas, if the length of the eighth character is in the vicinity of the fixed value (S122), whether the distortion quantity of the character is large is checked in step S123. Subsequently, if the distortion quantity of the character is small, the processing proceeds directly to step S125. If the distortion quantity of the character is large, however, the processing proceeds to step S125 after setting the "distorted state flag" in step S124. Checked in step S125 is whether the checking of lengths of characters are finished up to a twelfth character (adjacent to the end Guard bar on the side of the center bar). Then, if the checks of the lengths of the characters up to the twelfth character are finished, the processing proceeds to step S126 to demodulate six pieces of characters constituting a second block. Whereas, if the checks of the lengths of the characters are not yet finished up to the twelfth character, the processing returns to step S121 to check a length of the next character adjacent thereto.

In step 126, the character closest to the center bar is fetched out of the characters of which lengths are determined to be in the vicinity of the fixed value in steps S120 and S122, and the demodulating process for the fetched character is executed. In next step S127, whether the demodulating process in step S126 succeeds or not is checked. Then, if the demodulating process does not succeed, the processing proceeds to step S135 to finish this subroutine. If the demodulating process succeeds, the processing proceeds to step S128. In step S128, whether the distortion quantity of the character is large is checked. Then, if the distortion quantity of the character is small, the processing proceeds directly to step S130. Whereas, if the distortion quantity of the character is large, the "distorted state flag" is set in step S129, and the processing proceeds to step S130. Checked in step S130 is whether there are completed the demodulating processes corresponding to the number of the characters of which lengths are determined to be in the vicinity of the fixed value in the character length checking in steps S120 and S122. Then, if the demodulating processes for all the characters are not yet completed, the processing returns to step S126 to execute the demodulating process for the next adjacent character. In contrast with this, if the demodulating processes for all the characters are completed, the processing proceeds to step S131.

In step S131, the length of the twelfth character is again checked. Subsequently, if the length of the twelfth character is not in the vicinity of the fixed value (S132), the processing proceeds to step S135. If the length of the twelfth character is in the vicinity of the fixed value (S132), the end guard bar is checked in step S133. This check of the end guard bar is a process of checking whether the character next adjacent to the twelfth character coincides with a predetermined pattern set as the end guard bar. Then, when a desirable result of the end guard bar checking is obtained (S134), the bar width data set to be processed is determined to be the bar width data set obtained by the "continuous reading", and therefore processing proceeds to step S135. Contrastingly, when no desirable result of the end guard bar checking is obtained (S134), the bar width data set to be processed is determined to be the bar width data set obtained at least by the "block reading", and the processing therefore proceeds to step S135 to finish this subroutine.

Checked in step S135 is whether the data completely demodulated in steps S109 and S126 include the start guard bar and three or more characters. Then, if the completely demodulated data include the start guard bar and the three or more characters, the bar width data set to be processed can be determined to be the bar width data set obtained by at least the "divided reading", and hence a "completion-of-demodulation flag" is set in step S137, thus finishing this subroutine. Contrastingly, if the same data do not include the start guard bar and the three or more characters, a reliability on the data is comparatively low, the "completion-of-demodulation flag" is reset in step S136, and this subroutine is finished.

On the other hand, when it is judged that the bar width data set does not include the start guard bar, there is no such possibility that the bar width data set to be processed is obtained by the "continuous reading", the processing proceeds to step S138. In step S138, whether the bar width data set to be processed passes through the center bar is checked. Then, if the center bar is included therein, the processing proceeds to step S139. Steps S139 through S169 involves processes for demodulating the characters as far as possible to be demodulated in bilateral directions with the center bar as the center point.

In step S139, the lengths of the sixth and seventh characters are checked. Then, if both of the lengths of the sixth and seventh characters are not in the vicinity of the fixed value (S140), the bar width data set to be processed is conceived as a data set based on a pattern other than the bar code. In this case, the "completion-of-demodulation flag" is reset in step S136, and this subroutine comes to an end. In contrast with this, if any one of the lengths of the sixth and seventh characters is in the vicinity of the fixed value (S140), the processing proceeds to step S141.

Checked in step S141 is a length of the adjacent character (which is the seventh character in the initial status) on the side toward the end guard bar. Subsequently, if the length of the same adjacent character is not in the vicinity of the fixed value (S142), the processing proceeds to step S146 to demodulate the characters in the second data block of which length has hitherto been determined to be in the vicinity of the fixed value. Contrastingly, if the length of this character is in the vicinity of the fixed value (S142), whether the distortion quantity of the character is large or not is checked in step S143. Then, if the distortion quantity of the character is small, the processing proceeds directly to step S145. Whereas, if the distortion quantity of the character is large, the "distorted state flag" is set in step S144, and thereafter the processing proceeds to step S145. Checked in step S145 is whether the checking of the lengths of the six characters forming the second data block is finished. Then, if the checks of the lengths of the six characters are finished, the processing proceeds to step S146 to demodulate those six characters. Whereas, if the checks of the lengths of the six characters are not yet finished, the processing returns to step S141 to check a length of the next adjacent character.

In step S146, the character closest to the center bar is fetched out of the characters of which lengths are determined to be in the vicinity of the fixed value in steps S142, and the demodulating process for the fetched character is executed. In next step S147, whether the demodulating process in step S146 succeeds or not is checked. Then, if the demodulating process does not succeed, the processing proceeds directly to step S151. If the demodulating process succeeds, the processing proceeds to step S148. In step S148, whether the distortion quantity of the character is large is checked. Then, if the distortion quantity of the character is small, the processing proceeds directly to step S150. Whereas, if the distortion quantity of the character is large, the "distorted state flag" is set in step S149, and the processing proceeds to step S150. Checked in step S150 is whether there are completed the demodulating processes corresponding to the number of all characters of which lengths are determined to be in the vicinity of the fixed value in the character length checking in step S142. Then, if the demodulating processes for all the characters are not yet completed, the processing returns to step S146 to execute the demodulating process for the next adjacent character. In contrast with this, if the demodulating processes for all the characters are completed, the processing proceeds to step S151.

Checked in step S151 is whether the number of the characters that have been demodulated by the demodulating process in step S146 is 6. Then, if the number of the character is less than 6, the processing proceeds to step S154 to demodulate the characters included in the first data block. Contrastingly, if the number of the characters that have been demodulated is 6, the processing proceeds to step S152.

In step S152, the length of the twelfth character is again checked, and the end guard bar is checked. Subsequently, in any case (S153), the processing proceeds to step S154 to demodulate the characters included in the first data block.

Checked in step S154 is a length of the adjacent character (which is the sixth character in the initial status) on the side toward the start guard bar. Then, if the length of this adjacent character is not in the vicinity of the fixed value (S155), the processing proceeds to step S159 to demodulate the characters in the first data block of which length has hitherto been determined to be in the vicinity of the fixed value. Contrastingly, if the length of the same character is in the vicinity of the fixed value (S155), whether the distortion quantity is large or not is checked in step S156. Then, if the distortion quantity of the character is small, the processing proceeds directly to step S158. Whereas, if the distortion quantity of the character is large, the "distorted state flag" is set in step S157, and thereafter the processing proceeds to step S158. Checked in step S158 is whether the checking of the lengths of the six characters forming the first data block is finished. Then, if the checks of the lengths of the six characters are finished, the processing proceeds to step S159 to demodulate those six characters. Whereas, if the checks of the lengths of the six characters are not yet finished, the processing returns to step S154 to check a length of the next adjacent character.

In step S159, the character closest to the center bar is fetched out of the characters of which lengths are determined to be in the vicinity of the fixed value in steps S155, and the demodulating process for the fetched character is executed. In next step S160, whether the demodulating process in step S159 succeeds or not is checked. Then, if the demodulating process does not succeed, the processing proceeds directly to step S164. If the demodulating process succeeds, the processing proceeds to step S161. In step S161, whether the distortion quantity of the character is large or not is checked. Then, if the distortion quantity of the character is small, the processing proceeds directly to step S163. Whereas if the distortion quantity is large, the "distorted state flag" is set in step S162, and thereafter the processing proceeds to step S163. Checked in step S163 is whether there are completed the demodulating processes corresponding to the number of all characters of which lengths are determined to be in the vicinity of the fixed value in the character length checking in step S155. Then, if the demodulating processes for all the characters are not yet completed, the processing returns to step S159 to execute the demodulating process for the next character. In contrast with this, if the demodulating processes for all the characters are completed, the processing proceeds to step S164.

Checked in step S164 is whether the number of the characters that have been demodulated by the demodulating process in step S159 is 6. Then, if the number of the characters is 6, the processing proceeds to step S169. If less than 6 characters, the processing proceeds to step S165.

In step S165, the length of the first character is checked. If the length of the first character is not in the vicinity of the fixed value (which passes through a case where the first character is lost) (S166), the processing proceeds to step S169. Whereas, if the length of the first character is in the vicinity of the fixed value (S166), the start guard bar is checked in step S167. Then, if the start guard bar is detected (S168), this is contradictory to the determination made in step S101, and hence the "completion-of-demodulation flag" is reset in step S136, thus finishing this subroutine. Whereas, if the start guard bar is not detected (S168), the processing proceeds to step S169.

Checked in step S169 is whether the completely demodulated data set has such a construction that characters are continuously linked to both sides of the center bar. Then, if the data set has the construction, the "completion-of-demodulation flag" is set in step S137, and this subroutine is finished. Contrastingly, if the data set does not have the above-described construction, this implies a situation that might hardly happen, and the reliability of the data set is low. Therefore, the "completion-of-demodulation flag" is reset in step S136, and this subroutine is ended.

On the other hand, when it is judged that the bar width data set does not include the center bar in step S138, the bar width data set to be processed is not obtained by the "block reading", the processing proceeds to step S170. In step S170, whether the bar width data set to be processed passes through the end guard bar is checked. Then, if the end guard bar is included therein, the data width data set is conceived as based on a pattern other than the bar code. In this case, the "completion-of-demodulation flag" is reset in step S136, and this subroutine comes to an end. In contrast with this, if the bar width data set passes through the end guard bar, the processing proceeds to step S171. Steps S171 through S187 involve processes for demodulating the characters as far as possible to be demodulated in direction toward the center bar with the end guard bar as the starting point.

In step S171, the length of the twelfth character is checked. Subsequently, if the length of the twelfth character is not in the vicinity of the fixed value (S172), the bar width data set is conceived as a data set based on a pattern other than of the bar code. In this case, the "completion-of-demodulation flag" is reset in step S136, and this subroutine comes to an end. In contrast with this, if the length of the twelfth character is in the vicinity of the fixed value (S172), the processing proceeds to step S173.

Checked in step S173 is a length of the adjacent character (which is en eleventh character in the initial status) on the side toward the center bar. Subsequently, if the length of the same adjacent character is not in the vicinity of the fixed value (S174), the processing proceeds to step S178 to demodulate the characters in the second data block of which length has hitherto been determined to be in the vicinity of the fixed value. Contrastingly, if the length of this character is in the vicinity of the fixed value (S174), whether the distortion quantity of the character is large or not is checked in step S175. Then, if the distortion quantity of the character is small, the processing proceeds directly to step S177. Whereas, if the distortion quantity of the character is large, the "distorted state flag" is set in step S176, and thereafter the processing proceeds to step S177. Checked in step S177 is whether the checking of the lengths of the six characters forming the second data block is finished. Then, if the checks of the lengths of the six characters are finished, the processing proceeds to step S178 to demodulate those six characters. Whereas, if the checks of the lengths of the six characters are not yet finished, the processing returns to step S173 to check a length of the next adjacent character.

In step S178, the character closest to the end guard bar is fetched out of the characters of which lengths are determined to be in the vicinity of the fixed value in steps S172 or S174, and the demodulating process for the fetched character is executed. In next step S179, whether the demodulating process in step S178 succeeds or not is checked. Then, if the demodulating process does not succeed, the processing proceeds directly to step S183. If the demodulating process succeeds, the processing proceeds to step S180. In step S180, whether the distortion quantity of the character is large or not is checked. Then, if the distortion quantity of the character is small, the processing proceeds directly to step S182. Whereas, if the distortion quantity of the character is large, the "distorted state flag" is set in step S181, and the processing proceeds to step S182. Checked in step S182 is whether there are completed the demodulating processes corresponding to the number of all characters of which lengths are determined to be in the vicinity of the fixed value in the character length checking in step S172 or S174. Then, if the demodulating processes for all the characters are not yet completed, the processing returns to step S178 to execute the demodulating process for the next adjacent character. In contrast with this, if the demodulating processes for all the characters are completed, the processing proceeds to step S183.

In step S183, the length of the seventh character is checked. Then, if the length of the seventh character is not in the vicinity of the fixed value (which passes through a case where the seventh character is lost) (S184), the processing proceeds to step S187. Whereas, if the length of the seventh character is in the vicinity of the fixed value (S184), the center bar and the length of the sixth character are checked in step S185. Then, if the center bar is detected, or if the length of the sixth character is in the vicinity of the fixed value (S186), this is contradictory to the determination made in step S138, hence the "completion-of-demodulation flag" is rest in step S136, and this subroutine is finished. Whereas, if the center bar is not detected (S186), the processing proceeds to step S187.

Checked in step S187 is whether the data completely demodulated in step S178 include the end guard bar and three or more characters. Then, if the completely demodulated data include the end guard bar and the three or more characters, the bar width data set to be processed can be determined to be the bar width data set obtained by at least the "divided reading", hence the "completion-of-demodulation flag" is set in step S137, and this subroutine is finished. Contrastingly, if the same data do not include the end guard bar and the three or more characters, the reliability on the data is comparatively low, the "completion-of-demodulation flag" is reset in step S136, and this subroutine is finished.

Figure 7:
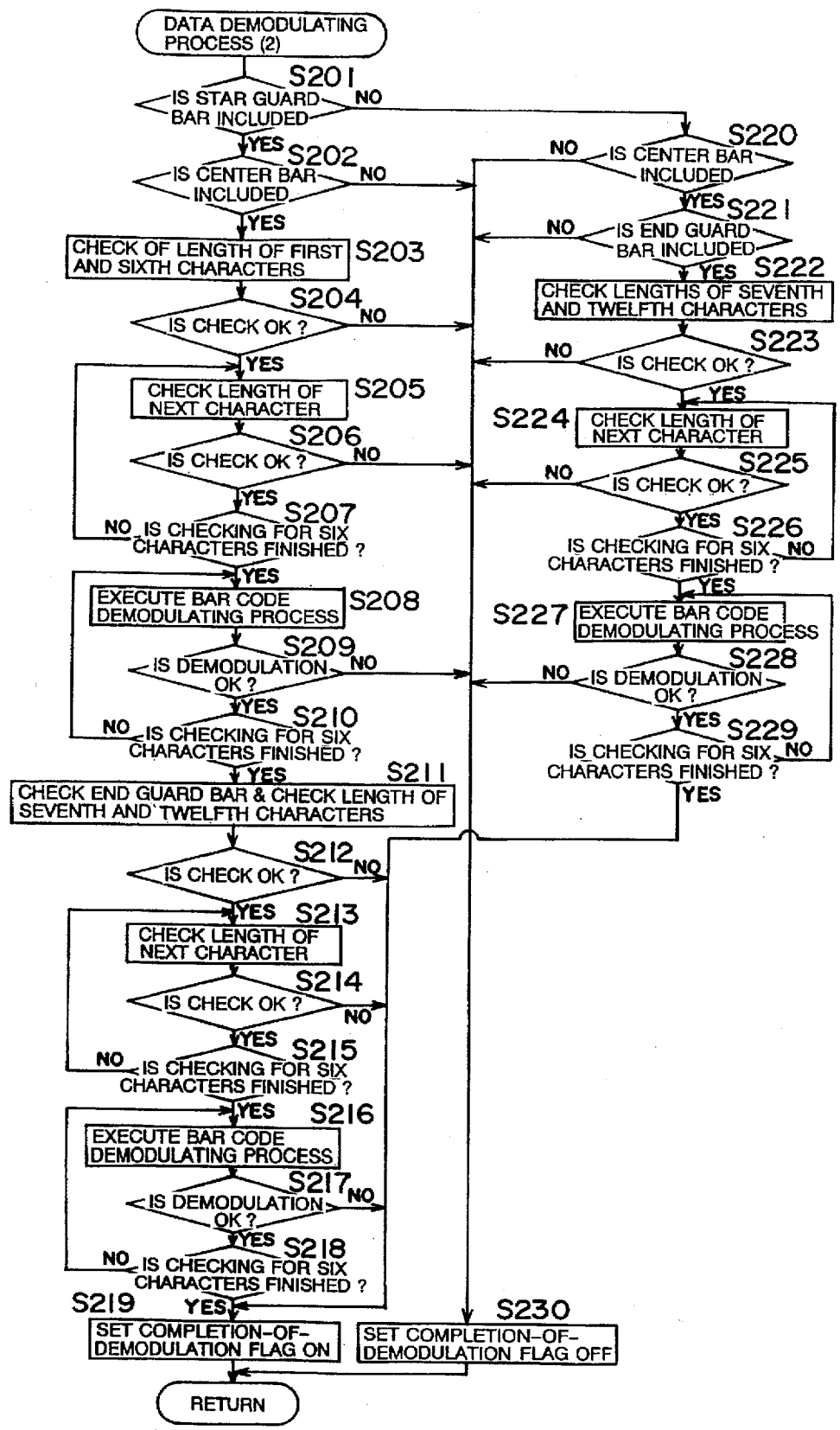
FIG. 7 is a flowchart showing a data demodulating process (2) executed in step S003 of FIG. 3.

Next, a content of the data demodulating process (2) executed in step S003 shown in FIG. 3 will be explained. FIG. 7 is a flowchart showing the subroutine of the data demodulating process (2). In first step S201 after entering this subroutine, the oldest bar width data set is fetched from the bar width data set storage buffer 2, and whether the fetched bar width data set passes through the start guard bar is checked. Then, if the same bar width data set passes through the start guard bar, the processing proceeds to step S202. Steps S202 through S218 involve processes for demodulating at least all the characters of the first block, beginning from the start guard bar.

In step S202, whether this bar width data set passes through the center bar is checked. Then, if the bar width data set does not include the center bar, the bar width data set to be processed is determined not to be based on the "block reading", and hence the "completion-of-demodulation flag" is reset in step S230, and this subroutine is finished. Contrastingly, if the bar width data set passes through the center bar, there is such a possibility that the bar width data set to be processed is obtained by the "block reading" of the first data block, therefore the processing proceeds to step S203.

In step S203, the lengths of the first character (adjacent to the start guard bar on the side toward the center bar) and of the sixth character (adjacent to the center bar on the side toward the start guard bar) are checked. Subsequently, if the length of the first or sixth character is not in the vicinity of the fixed value (S204), the bar width data set to be processed is conceived as a data set based on a pattern other than the bar code, the "completion-of-demodulation flag" is reset in step S230, and this subroutine comes to an end. In contrast with this, if the lengths of both the first and sixth characters are in the vicinity of the fixed value (S204), the processing proceeds to step S205.

Checked in step S205 is a length of the adjacent character (which is the second character next to the first character in the initial status). Then, if the length of the same adjacent character is not in the vicinity of the fixed value (S206), the bar width data set is conceived as based on a pattern other than the bar code, therefore the "completion-of-demodulation flag" is reset in step S230, and this subroutine is ended. Contrastingly, if the length of the same character is in the vicinity of the fixed value (S206), whether the checking processes of the length of the characters are finished for the six characters of the first data block is checked in step S207. Then, if the checking processes for the six characters are not yet finished, the processing returns to step S205 to check a length of the next adjacent character. If the checking processes for the six characters are finished, the processing proceeds to step S208 to execute the demodulating process.

In step S208, the character closest to the start guard bar is fetched out of the characters of which lengths are determined to be in the vicinity of the fixed value in steps S204 or S206, and the demodulating process for the fetched character is executed. In next step S209, whether the demodulating process in step S208 succeeds or not is checked. Then, if the demodulating process does not succeed, the "completion-of-demodulation flag" is reset in step S230, and this subroutine is finished. Contrastingly, if the demodulating process succeeds, the processing proceeds to step S210.

In step S210, whether the demodulating processes for the six characters are completed or not is checked. Then, if the demodulating processes for the six characters are not yet finished, the processing returns to step S208 to execute the demodulating process for the next adjacent character. If the demodulating processes for the six characters are finished, the processing proceeds to step S211 to execute the demodulating process for the second data block.

In step S211, whether the bar width data set to be processed at present passes through the end guard bar is checked, and the lengths of the seventh character (adjacent to the center bar on the side toward the end guard bar) and of the twelfth character (adjacent to the end guard bar on the side toward the center bar), are checked. Then, if the end guard bar is not detected, and if the length of the seventh or twelfth character is not in the vicinity of the fixed value (S212), the bar width data set to be processed is conceived as not obtained by the "continuous reading" but by the "block reading". Therefore, the "completion-of-demodulation flag" is set in step S219, and this subroutine comes to an end. In contrast with this, if the end guard bar is detected and the lengths of the seventh and twelfth characters are in the vicinity of the fixed value (S212), the processing proceeds to step S213.

Checked in step S213 is a length of the adjacent character (which is the eighth character next to the seventh character in the initial status). Subsequently, if the length of the same adjacent character is not in the vicinity of the fixed value (S214), the data width data set to be processed is determined not to be obtained the "continuous reading", and the "completion-of-demodulation flag" is set in step S219. Then, this subroutine comes to an end. In contrast with this, if the length of the same character is in the vicinity of the fixed value (S214), whether the checking processes of the lengths of the six characters are finished for the six characters in the second data block is checked in step S215. Then, if the checking process of the lengths for the six characters are not yet finished, the processing is returned to step S213 to check a length of the next adjacent character. If the checking processes of the lengths for the six characters are finished, the processing proceeds to step S216 to execute the demodulating process.

In step S216, the character closest to the start guard bar is fetched out of the characters of which lengths are determined to be in the vicinity of the fixed value in steps S212 or S214, and the demodulating process for the fetched character is executed. In next step S217, whether the demodulating process in step S216 succeeds or not is checked. Then, if the demodulating process does not succeed, the bar width data set is conceived as based on the "block reading", the "completion-of-demodulation flag" is set in step S219, and this subroutine comes to an end. In contrast with this, if the demodulating process succeeds, the processing proceeds to step S218.

In step S218, whether the demodulating processes for the six characters are completed or not is checked. Then, if the demodulating processes for the six characters are not yet finished, the processing returns to step S216 to execute the demodulating process for the next adjacent character. If the demodulating processes for the six characters are finished, the bar width data set to be processed is conceived as based on the "continuous reading", hence the "completion-of-demodulation flag" is set in step S219, thus finishing this subroutine.

On the other hand, if it is determined that the bar width data set to be processed does not include the start guard bar in step S201, there is no such possibility that the same bar width data set is obtained by the "continuous reading", the processing proceeds to step S220. In step S220, whether the bar width data set passes through the center bar is checked. Then, if the center bar is not included therein, there is no possibility in which the bar width data set to be processed is obtained by the "block reading", therefore the "completion-of-demodulation flag" is reset in step S230, and this subroutine comes to an end. In contrast with this, if the center bar is included therein, the processing proceeds to step S221. Steps S221 through S229 involve processes for demodulating all the characters of the second block.

In step S221, whether the same bar width data set passes through the end guard bar is checked. Then, if the end guard bar is not included therein, there is no possibility in which the bar width data set is obtained by the "block reading", therefore the "completion-of-demodulation flag" is reset in step S230, and this subroutine is finished. In contrast with this, if the end guard bar is included therein, there exists the possibility in which the bar width data set is obtained by performing the "block reading" the second data block, and consequently the processing proceeds to step S222.

In step S222, the lengths of the seventh character (adjacent to the center bar on the side toward the end guard bar) and of the twelfth character (adjacent to the end guard bar on the side toward the center bar) are checked. Subsequently, if the length of the seventh or twelfth character is not in the vicinity of the fixed value (S223), the bar width data set is conceived as based on a pattern other than of the bar code, the "completion-of-demodulation flag" is reset in step S230, and this subroutine comes to an end. In contrast with this, if the lengths of both the seventh and twelfth characters are in the vicinity of the fixed value (S223), the processing proceeds to step S224.

Checked in step S224 is a length of the adjacent character (which is the eighth character next to the seventh character in the initial status). Then, if the length of the same adjacent character is not in the vicinity of the fixed value (S225), the bar width data set is conceived as based on a pattern other than the bar code, therefore the "completion-of-demodulation flag" is reset in step S230, and this subroutine is ended. Contrastingly, if the length of the same character is in the vicinity of the fixed value (S225), whether the checking processes of the length of the characters are finished for the six characters of the second data block is checked in step S226. Then, if the checking processes for the six characters are not yet finished, the processing returns to step S224 to check a length of the next adjacent character. If the checking processes for the six characters are finished, the processing proceeds to step S227 to execute the demodulating process.

In step S227, the character closest to the center bar is fetched out of the characters of which lengths are determined to be in the vicinity of the fixed value in steps S223 or S225, and the demodulating process of the fetched character is executed. In next step S228, whether the demodulating process in step S227 succeeds or not is checked. Then, if the demodulating process does not succeed, the "completion-of-demodulation flag" is reset in step S230, and this subroutine is finished. Contrastingly, if the demodulating process succeeds, the processing proceeds to step S229.

In step S229, whether the demodulating processes for the six characters are completed or not is checked. Then, if the demodulating processes for the six characters are not yet finished, the processing returns to step S227 to execute the demodulating process for the next adjacent character. If the demodulating process for the six characters are finished, the "completion-of-demodulation flag" is set in step S219, and this subroutine is terminated.

(Operation of Bar Code Reading Apparatus)

The operation of the bar code reading apparatus in the first embodiment will be explained with reference to FIGS. 15 through 17. As shown in FIG. 15, it is assumed that a first data block of the bar code in the UPC code format is stored with data characters into which pieces of data "A", "B", "C", "D", "E", "F" are respectively encoded. A second data block is stored with data characters into which pieces of data "a", "b", "c", "d", "e", "f" are respectively encoded. It is then assumed that the scan optical system 14 scan the data characters several times with the laser beams L along trajectories as shown by arrows (1)–(7). In this case, the data characters of which bar width data are read by such respective scans are given as shown in a table of FIG. 16. Note that bar width count values "d'", "e'", "f'" read by the scan (7) are bar width count values obtained by reading a pattern other than the bar code. It is also to be noted that the scans along the respective trajectories are, as shown in a time chart of FIG. 17, performed in a sequence such as (1)→(3)→(5)→(1)→(2)→(3)→(4)→(7)→(5).

The CPU 1 executes the bar code recognizing/demodulating process shown in FIGS. 3 to 8, synchronizing it with the above scans. In this case, until the modulus 10 check in step S006 shown in FIG. 3 becomes OK (till the demodulated data corresponding to the whole bar code are acquired), the "read flag=OFF" is always established in step S001, and the data demodulating process (1) in step S002 is executed. Accordingly, there are demodulated all of the bar width data set obtained by the "divided reading" along the trajectory (1), the bar width data set obtained by the "block reading" of the first block along the trajectory (3) and the bar width data set obtained by the "block reading" of the second block along the trajectory (5). Those demodulated bar width data sets are stored in the demodulated data temporary saving buffer 2. Note that even if a bar width data set including no center bar or guard bars or a bar width data set without three characters is obtained by a scan unshown in FIG. 15, the "completion-of-demodulation flags" are reset (S136), and therefore those data sets are never stored in the demodulated data temporary saving buffer 6 (S004).

When the demodulated data temporary saving buffer 6 is stored with the bar width data set read by the scan (5), the modulus 10 check becomes OK as a result of synthesizing the data. In this case, it is checked whether the demodulated data set obtained by the "continuous reading" or a combination of the data set obtained by the "block reading" of the first data block and the data set obtained by the "block reading" of the second data block has been the basis for the data synthesization or not (S008, S009).

If the demodulated data set which is acquired by demodulating the bar width data set obtained by the "divided reading" had been the basis for the data synthesization the "read flag" would remain reset. In this case, it would follow that the data demodulating process (1) in step S002 is executed even in the second demodulating process that will be subsequently executed. As a result, the bar code could be read without smoothing, e.g. as in the case of the bar code printed on the bag, etc.

Figures 16, 17:
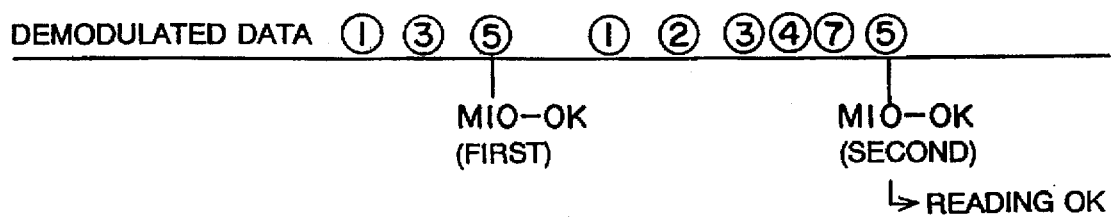
FIG. 16 is a list of data characters that can be read by each scan trajectory.
FIG. 17 is a time chart showing an example of scan sequence along the respective scan trajectories.

In the examples shown in FIGS. 15 through 17, however, the demodulated data set corresponding to the trajectory (3) is acquired by demodulating the bar width data set obtained by the "block reading" of the first block, and the demodulated data set corresponding to the trajectory (5) is acquired by demodulating the bar width data set obtained by the "block reading" of the second block, and therefore it follows that the data demodulating process (2) in step S003 is executed.

Accordingly, when the bar width data set is read in the sequence shown in FIG. 17, the bar width data Set based on the "divided reading" is discarded of without being demodulated (S202, S221). More specifically, the bar width data set read by the scan (1), the bar width data set read by the scan (2) (because of reading no center bar), the bar width data set read by the scan (4) and the bar width data set picked by the scan (7), are discarded of without the demodulation. Extracted subsequently are only the bar width data set obtained on the "block reading" and the bar width data set obtained on the "continuous reading", and these data sets become objects for the demodulating process. That is, only the bar width data set read by the scan (3) and the bar width data set read by the scan (5) are demodulated (S216, S227) and then stored in the demodulated data temporary saving buffer 6.

Accordingly, if the bar code is printed on a flat surface of a comparatively hard body such as a box or the like, the reliability of the demodulated data is enhanced by eliminating the data obtained by the "divided reading" accompanied with a possibility of misreading, and the data demodulation obtained by the "divided reading" can be omitted. The demodulating process can be therefore completed in a short period of time.

Incidentally, when the demodulated data temporary saving buffer 6 is stored with the bar width data set read by the scan (5) of the second time, the modulus 10 check becomes again OK as a result of the data synthesization. As a consequence, since there is given OK as to the number of coincidences (S007), a read OK process is executed (S011).

Second Embodiment

A second embodiment of the present invention, as compared with the first embodiment discussed herein above, has a characteristic, wherein a condition that each item of demodulated data has been checked in the modulus 10 check in step S006 as having a small distortion quantity is added for the modulus 10 OK data checking process in step S008.

FIG. 18 shows a data check processing subroutine of the modulus 10 OK executed in step S008 in accordance with the second embodiment.

Checked in first step S401 after entering this subroutine is whether each piece of demodulated data (serving as the basis for the synthesization in step S005) to which the modulus 10 check is executed in step S006 is based on the bar width data set obtained by the "continuous reading" or the bar width data set in which characters are continuously linked over one or more blocks. Then, if the demodulated data is based on neither the bar width data set obtained by the "continuous reading" nor the bar width data set in which the data characters are continuously linked over one or more blocks, the this subroutine is directly finished, and the processing returns to the main routine shown in FIG. 3. Whereas, if the above demodulated data is based on either the bar width data set obtained by the "continuous reading" or the bar width data set in which the data characters are continuously linked over one or more blocks, the processing proceeds to step S402.

Checked in step S402 is whether each piece of demodulated data (serving as the basis for the synthesization in step S005) to which the modulus 10 check is executed in step S006 is based on the bar width data set having a large distortion quantity. This check is performed in accordance with whether or not the "distorted state flag" is set in the RAM area of the CPU 1. Then, if it is based on the bar width data set having a large distortion quantity (if the "distorted state flag" is set), this subroutine is directly finished, and the processing is returned to the main routine shown in FIG. 3. Contrastingly, if it is based on the bar width data set having a small distortion quantity (if the "distorted stage flag" is reset), this subroutine is ended after setting the "check OK flag" in step S403, and the processing is returned to the main routine of FIG. 3.

In accordance with the second embodiment, the "check OK flag" is not set in even such a case that the demodulated data serving as the basis for the synthesization are obtained by demodulating the bar width data set having the large distortion quantity as well as the case where each item of demodulated data serving as the basis for the synthesization is acquired by demodulating the bar width data set obtained by the "divided reading". In such a case, therefore, the data demodulating process (1) (S002) for demodulating the bar width data set obtained by the "divided reading" is executed subsequently.

Hence, when the bar code printed on the bag or the like with a large distortion is read, the data demodulating process (1) for demodulating even the bar width data set obtained by the "divided reading" is executed, and it is therefore possible to surely read the bar width data set which can be a basis of the synthesization of the demodulated data corresponding to the whole bar code.

Other configurations, processing contents and operations in the second embodiments are same as those in the first embodiment discussed herein above, and their explanations are therefore omitted.

According to the thus constructed bar code reading apparatus and bar code reading method of the present invention, the "divided reading" process is effected on the bar code suited to the "divided reading" as in the case of the bar code printed on the bag, etc. The bar code reading mode is automatically switched to the "block reading" process for the bar code which can be read by the "block reading" as in the case of the bar code printed on the box or the like. As a result, the labor to stretch the bag when reading the bar code can be omitted, and the bar code demodulation processing time can be reduced as much as possible.

This invention being thus described, it will be obvious that same may be varied in same way. Such variations are not regarded as a departure from the spirit and scope of the invention, and all such modifications as would be obvious to one skilled in the art intended to be included within the scope of the following claims.

We claim:

1. A bar code reading apparatus for scanning a bar code interposed between distinguishing bars having fixed patterns, detecting a bright/dark pattern along a scan trajectory, and demodulating the bright/dark pattern into a data set encoded into the bar code, said apparatus comprising:

first demodulating means for demodulating both of a first bright/dark pattern along the scan trajectory that passes through only one of the distinguishing bars and a second bright/dark pattern along the scan trajectory that passes through both of the distinguishing bars;

second demodulating means for demodulating only the second bright/dark pattern;

whole data set acquiring means for acquiring whole data sets corresponding to the whole bar code on the basis of the data set demodulated by said first demodulating means or said second demodulating means; and control means for making only said first demodulating means execute the demodulation before said whole data set acquiring means acquires the whole data sets on the basis of only the second bright/dark pattern, and making only said second demodulating means perform the demodulation after acquiring the whole data sets on the basis of the second bright/dark pattern.

2. A bar code reading apparatus for scanning a bar code having three pieces of distinguishing bars with fixed patterns and composed of bar code blocks interposed between the respective distinguishing bars, detecting bright/dark patterns along scan trajectories, and demodulating the bright/dark patterns into data sets encoded into the bar code, said apparatus comprising:

first demodulating means for demodulating all of a first type of a bright/dark pattern along the scan trajectory that passes through only one piece of distinguishing bar, a second type of a bright/dark pattern along the scan trajectory that passes through only two pieces of distinguishing bars, and a third type of a bright/dark pattern along the scan trajectory that passes through three pieces of distinguishing bars;

second demodulating means for demodulating only the second type of the bright/dark pattern and the third type of the bright/dark pattern;

whole data set acquiring means for acquiring whole data sets corresponding to the whole bar code on the basis of data sets demodulating by said first demodulating means or said second demodulating means; and control means for making only said first demodulating means execute the demodulation before said whole data set acquiring means acquires the whole data sets on the basis of only the second type of the bright/dark pattern or the third type of the bright/dark pattern, and making only said second demodulating means perform the demodulation after acquiring the whole data sets on the basis of the second type of the bright/dark pattern or the third type of the bright/dark pattern.

3. A bar code reading apparatus according to claim 1, wherein, the bar code being composed of a plurality of characters into which pieces of data are respectively encoded, said first demodulating means demodulates only the bright/dark pattern along the scan trajectory that passes through a single distinguishing bar which includes a fixed number of characters which are mutually linked.

4. A bar code reading apparatus according to claim 1, wherein, the bar code being composed of a plurality of characters into which pieces of data are respectively encoded, said first demodulating means and said second demodulating means perform the demodulation only when a length of the bright/dark pattern corresponding to each character falls within a fixed range.

5. A bar code reading apparatus according to claim 1, wherein, the bar code being composed of a plurality of characters into which pieces of data are respectively encoded, said control means makes only said first demodulating means perform the demodulation also after said whole data set acquiring means has acquired the whole data sets on the basis of only the second bright/dark pattern if a ratio between the bright/dark patterns corresponding to the respective characters exceeds a fixed range.

6. A bar code reading apparatus according to claim 2, wherein, the bar code being composed of a plurality of characters into which pieces of data are respectively encoded, said control means makes only said first demodulating means perform the demodulation also after said whole data set acquiring means has acquired the whole data sets on the basis of the second type of the bright/dark pattern or the third type of the bright/dark pattern if a ratio between the bright/dark patterns corresponding to the respective characters exceeds a fixed range.

7. A bar code reading apparatus according to claim 5, wherein, each character being composed of a plurality of modules, said control means makes only said first demodulating means perform the demodulation also after said whole data set acquiring means has acquired the whole data sets on the basis of only the second bright/dark pattern if a ratio between the bright/dark patterns corresponding to the respective modules exceeds a fixed range.

8. A bar code reading apparatus according to claim 6, wherein, each character being composed of a plurality of modules, said control means makes only said first demodulating means perform the demodulation also after said whole data set acquiring means has acquired the whole data sets on the basis of the second type of the bright/dark pattern or the third type of the bright/dark pattern if a ratio between the bright/dark patterns corresponding to the respective modules exceeds a fixed range.

9. A bar code reading method of scanning a bar code interposed between distinguishing bars having fixed patterns, detecting a bright/dark pattern along a scan trajectory, and demodulating the bright/dark pattern into a data set encoded into the bar code, said method comprising:

a step of demodulating both of a first bright/dark pattern along the scan trajectory that passes through only one of the distinguishing bars and a second bright/dark pattern along the scan trajectory that passes through both of the distinguishing bars;

a step of acquiring the whole data sets corresponding to the whole bar code on the basis of the first bright/dark pattern or the second bright/dark pattern; and a step of demodulating only the second bright/dark pattern after acquiring the whole data sets on the basis of only the second bright/dark pattern.

10. A bar code reading method of scanning a bar code having three pieces of distinguishing bars with fixed patterns and composed of bar code blocks interposed between the respective distinguishing bars, detecting bright/dark patterns along scan trajectories, and demodulating the bright/dark patterns into data sets encoded into the bar code, said method comprising:

a step of demodulating all of a first type of a bright/dark pattern along the scan trajectory that passes through only one piece of distinguishing bar, a second type of a bright/dark pattern along the scan trajectory that passes through only two pieces of distinguishing bars, and a third type of a bright/dark pattern along the scan trajectory that passes through three pieces of distinguishing bars;

a step of acquiring whole data sets corresponding to the whole bar code on the basis of the first type of the bright/dark pattern, the second type of the bright/dark pattern or the third type of the bright/dark pattern; and a step of demodulating only the second type of the bright/dark pattern and the third type of the bright/dark pattern after acquiring the whole data sets on the basis of only the second type of the bright/dark pattern or the third type of the bright/dark pattern.

* * * * *